United States Patent
Podesva et al.

[11] 3,855,294
[45] Dec. 17, 1974

[54] SUBSTITUTED 1-AMINOADAMANTANES

[75] Inventors: Ctirad Podesva; Carola Solomon, both of Montreal, Quebec, Canada

[73] Assignee: Delmar Chemicals Limited, Montreal, Quebec, Canada

[22] Filed: Oct. 2, 1967

[21] Appl. No.: 671,935

[30] Foreign Application Priority Data
Oct. 18, 1966  Great Britain .................... 46575/66

[52] U.S. Cl.... 260/570 R, 260/570.5 R, 260/563 P, 260/570.5 C, 260/570.6, 260/999
[51] Int. Cl. .......................................... C07c 87/28
[58] Field of Search ............... 260/570.5, 570.6, 570

[56] References Cited
OTHER PUBLICATIONS
Podesva et al., "Journal Med. Chem.," Vol. 11, No. 3, pp. 634–635, (1968).

*Primary Examiner*—Robert V. Hines
*Attorney, Agent, or Firm*—Cushman, Darby & Cushman

[57] ABSTRACT

1-Aminoadamantane derivatives of the formula:

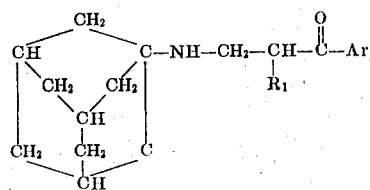

or pharmaceutically acceptable acid addition salts thereby wherein $R_1$ is hydrogen or lower alkyl and Ar is an unsubstituted or nitro-, halo-, lower alkoxy- or lower alkyl-substituted aryl group, are prepared by reacting 1-aminoadamantane or an acid addition salt thereof with formaldehyde or a polymer thereof and an alkyl aryl ketone of the formula:

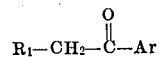

The ketone thus obtained leads to the corresponding alcohol by reduction. From the alcohol there is obtained by substitution the corresponding halogen. The alcohol or the halogen react in the presence of a Lewis acid with a compound ArH to obtain the corresponding di-aryl derivative. The products show central nervous system activity.

10 Claims, No Drawings

SUBSTITUTED 1-AMINOADAMANTANES

FIELD OF THE INVENTION

This invention relates to novel derivatives of 1-aminoadamantane. This invention also relates to the acid addition salts thereof.

SUMMARY OF THE INVENTION

The compounds of the present invention can be represented by the following general formula:

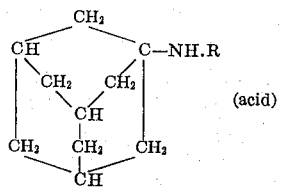

in which R is selected from the group consisting of

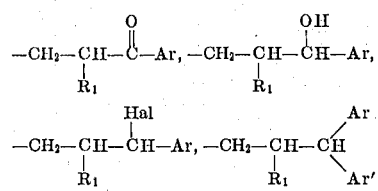

where Ar and Ar' are the same or different and each represents an unsubstituted or a substituted aryl group, such as for example, a phenyl group, or a mono- or di- trisubstituted phenyl group, the substituents being nitro groups, halogens such as for example, chlorine or bromine, alkoxy groups such as for example, methoxy or ethoxy groups, hydroxy groups, lower alkyl group such as for example, methyl or ethyl group, $R_1$ represents a lower alkyl group such as for example, a methyl or ethyl group or hydrogen and Hal represents a halogen.

The compounds of the present invention are prepared by reacting 1-aminoadamantane, or preferably an acid addition salt thereof, conveniently its hydrochloride with formaldehyde or its polymer and an aryl alkyl ketone, such as for example, acetophenone or propiophenone, which in turn may be substituted in the aromatic ring by substituents listed above, whereby the β-adamantanylaminoketones are formed. The corresponding alcohols are obtained from the ketones in a known manner such as for example, by reduction with a metal hydride, catalytic reduction. These alcohols in turn can be easily transformed into their corresponding halides by methods known to those skilled in the art, e.g., by treatment with thionyl chloride. Condensation of the above mentioned alcohols or halides with an aryl compound such as benzene or substituted benzene in presence of a Lewis acid such as for example, anhydrous aluminium chloride produces 1-adamantanylamino-3,3-diarylpropanes. It is therefore to be understood that some compounds disclosed in the present invention constitute at the same time starting materials for the production of other compounds disclosed in the same invention.

The products of the present invention generally showed a depressing effect on the central nervous system. They showed a strong depressant and sedative activity when administered in low dosage to mice and especially when administered by injection in suspension. As such, they are of potential value as tranquilizers and sedatives. They can be administered in pharmaceutical form in admixture with the usual pharmaceutical carriers.

The bases of the invention can be transformed into equivalent pharmaceutically acceptable acid addition salts, preferred in some cases for ease of administration, by reaction with suitable acids.

DESCRIPTION OF THE PREFERRED EMBODIMENTS

In order that the invention be fully understood, the following examples are given for illustration, but they should not be construed as limiting its scope. The products described were identified by analysis and by spectroscopic methods.

EXAMPLE 1

A mixture of 47 g of 1-aminoadamantane hydrochloride, 33 g of acetophenone and 30 g of 37% aqueous formaldehyde acidified with 2 ml. of concentrated hydrochloric acid was heated under reflux for 4 hours. After cooling to room temperature, the reaction mixture was diluted with acetone and the crystalline 1-(3-phenyl-3-oxopropylamino)-adamantane was collected by filtration. The pure product had a m.p. of 215°C. after recrystallization from a methanol-ether mixture.

EXAMPLE 2

To a solution of 8.9 g of 1-(3-phenyl-3-oxopropyl)-aminoadamantane in 100 ml. of methanol were added 10 ml. of water and 0.7 g of sodium borohydride. After standing for 3 hours at room temperature, the reaction mixture was diluted with water and the reaction product was extracted into chloroform. Dry hydrochloric acid gas was introduced into the chloroform extract, the solvent distilled off in vacuo and the residue purified by crystallization from a methanol-ether mixture. The pure 1-(3-phenyl-3-hydroxypropylamino)-adamantane hydrochloride had a m.p. of 229° - 302°C.

EXAMPLE 3

To a suspension of 5 g of 1-(3-phenyl-3-hydroxypropylamino)-adamantane hydrochloride in 75 ml. of dry benzene were added in portions 3.11 g of anhydrous aluminium chloride and the mixture was heated under reflux for 30 mixtures. The cooled reaction mixture was then poured on a mixture of ice and hydrochloric acid and allowed to reach room temperature. The benzene layer was separated, the aqueous layer was made alkaline with aqueous sodium hydroxide, extracted with chloroform, the extract was combined with the previously separated benzene layer and dry hydrochloric acid gas was introduced. The solvents were then removed by distillation in vacuo and the residue purified by crystallization from methanol-ethyl acetate. The pure 1-(3,3-diphenylpropylamino)-adamantane hydrochloride had a m.p. of 301°-304°C.

EXAMPLE 4

Into a solution of 2 g of 1-(3-phenyl-3-hydroxypropylamino)-adamantane in 40 ml. of dry chloroform, dry hydrochloric acid was introduced in order to transform the free base into the hydrochloride. After addition of 1 ml. of thionyl chloride, the mixture was heated under reflux for 90 minutes. The solvent was removed by distillation in vacuo and the residue purified by crystallization from a methanol-ethyl acetate mixture. The pure 1-(3-phenyl-3-chloropropylamino)-adamantane had a m.p. of 301°C.

EXAMPLE 5

The process described in Example 3 was repeated, using 1-(3-phenyl-3-chloropropylamino)-adamantane instead of 1-(3-phenyl-3-hydroxypropylamino)-adamantane. The same product as in Example 3 was obtained after working up the reaction mixture.

In an analogous manner, the following compounds were obtained:

In the following list, all the 3-oxo derivatives were prepared in the same manner as Example 1, all the 3-hydroxy derivatives were prepared in the same manner as Example 2, all the 3-halo derivatives were prepared in the same manner as Example 4 and all the di-aryl derivatives were prepared in the same manner as Examples 3 and 5.

1-(3-phenyl-3-oxo-2-methylpropylamino)-adamantane hydrochloride, m.p. 188°–90°C.

1-(3-phenyl-3-hydroxy-2-methylpropylamino)-adamantane hydrochloride, m.p. 306°–7°C.

1-(3,3-diphenyl-2-methylpropylamino)-adamantane hydrochloride, m.p. 272°C.

1-(3-(4-chlorophenyl)-3-oxopropylamino)-adamantane hydrochloride, m.p. 225° – 6°C.

1-(3-(4-chlorophenyl)-3-hydroxypropylamino)-adamantane hydrochloride, m.p. 316° 8°C.

1-(3-(4-chlorophenyl)-3-phenylpropylamino)-adamantane hydrochloride, m.p. 304° – 6°C.

1-(3,3-bis-(4-chlorophenyl)-propylamino)-adamantane hydrochloride, m.p. 322°C.

1-(3-(4-nitrophenyl)-3-oxopropylamino)-adamantane hydrochloride, m.p. 232° – 5°C.

1-(3-(4-nitrophenyl)-3-hydroxypropylamino)-adamantane hydrochloride, m.p. 309° – 10°C.

1-(3-(4-nitrophenyl)-3-phenylpropylamino)-adamantane hydrochloride, m.p. 234° – 6°C.

1-(3-(4-methoxyphenyl)-3-oxopropylamino)-adamantane hydrochloride, m.p. 204° – 7°C.

1-(3-(4-methoxyphenyl)-3-hydroxypropylamino)-adamantane (base), m.p. 86° – 7°C.

1-(3-bis-(4-methoxyphenyl)-propylamino)-adamantane hdyrochloride, m.p. 305°C.

1-(3-(4-methylphenyl)-3-oxopropylamino)-adamantane hydrochloride, m.p. 213°C.

1-(3-(4-methylphenyl)-3-hydroxypropylamino)-adamantane hydrochloride, m.p. 263°C.

1-(3-bis-(4-methylphenyl)-propylamino)-adamantane hydrochloride, m.p. 315°C.

1-(3-(3,4,5-trimethoxyphenyl)-3-oxopropylamino)-adamantane hydrochloride, m.p. 219° – 20°C.

1-(3-(4-hydroxyphenyl)-3-phenylpropylamino)-adamantane hydrochloride, m.p. 319° – 20°C.

1-(3-phenyl-3-oxo-2-ethylpropylamino)-adamantane hydrochloride, m.p. 215°C.

We claim:
1. A 1-aminoadamantane derivative of formula I

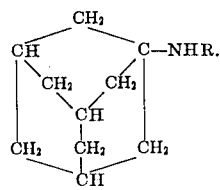

or a pharmaceutically acceptable acid addition salt thereof wherein R represents a radical selected from the group consisting of

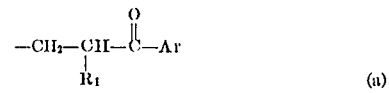

and

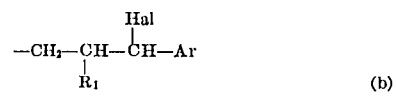

wherein Ar represents an unsubstituted or a mono nitro-substituted or mono halo-substituted or mono lower alkoxy-substituted or mono lower alkyl-substituted phenyl, $R_1$ represents hydrogen or a lower alkyl group, and Hal represents a halogen.

2. A 1-aminoadamantane derivative having the following formula:

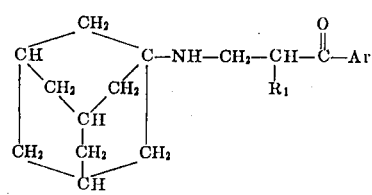

wherein Ar represents an unsubstituted or a mono nitro-substituted or mono halo-substituted or mono lower alkoxy-substituted or mono lower alkyl-substituted phenyl, and $R_1$ represents hydrogen or a lower alkyl group.

3. A 1-aminoadamantane derivative having the following formula:

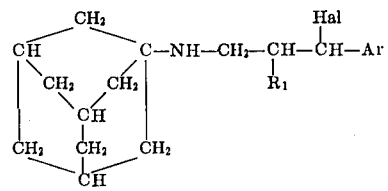

wherein Ar represents an unsubstituted or a mono nitro-substituted or mono halo-substitued or mono lower alkoxy-substituted or mono lower alkyl-substituted phenyl, and $R_1$ represents hydrogen or a lower alkyl group, and Hal represents a halogen.

4. 1-(3-Phenyl-3-oxopropylamino)-adamantane.
5. 1-(3-Phenyl-3-chloropropylamino)-adamantane.
6. A compound according to claim 1 which is 1-(3-phenyl-3-oxo-2-methylpropylamino)-adamantane hydrochloride.
7. A compound according to claim 1 which is 1-(3-(4-chlorophenyl)-3-oxopropylamino)-adamantane hydrochloride.
8. A compound according to claim 1 which is 1-(3-(4-nitrophenyl)-3-oxopropylamino)-adamantane hydrochloride.
9. A compound according to claim 1 which is 1-(3-(4-methoxyphenyl)-3-oxopropylamino)-adamantane hydrochloride.
10. A compound according to claim 1 which is 1-(3-(4-methylphenyl)-3-oxopropylamino)-adamantane hydrochloride.

* * * * *